United States Patent
Keightley (10) Patent No.: US 9,421,694 B2
(45) Date of Patent: Aug. 23, 2016

(54) HOLE SAW ASSEMBLY INCLUDING DRIVE SHAFTS SUPPORTED BY A ROTATABLE ANNULUS

(76) Inventor: Kym John Keightley, Fairview Park (AU)

( * ) Notice: Subject to any disclaimer, the term of this patent is extended or adjusted under 35 U.S.C. 154(b) by 1177 days.

(21) Appl. No.: 12/516,606

(22) PCT Filed: Nov. 28, 2007

(86) PCT No.: PCT/AU2007/001822
§ 371 (c)(1),
(2), (4) Date: May 28, 2009

(87) PCT Pub. No.: WO2008/064409
PCT Pub. Date: Jun. 5, 2008

(65) Prior Publication Data
US 2010/0067995 A1    Mar. 18, 2010

(30) Foreign Application Priority Data
Nov. 28, 2006   (AU) ................................ 2006906651

(51) Int. Cl.
*B23B 51/04* (2006.01)
*B27B 5/32* (2006.01)
*B27B 5/12* (2006.01)

(52) U.S. Cl.
CPC ............. *B27B 5/32* (2013.01); *B23B 51/0426* (2013.01); *B23B 51/0473* (2013.01); *B27B 5/12* (2013.01); *Y10T 279/16* (2015.01); *Y10T 408/51* (2015.01); *Y10T 408/895* (2015.01);
(Continued)

(58) Field of Classification Search
CPC .......... B23B 51/0406; B23B 51/0426; B23B 51/0473; Y10T 279/16; Y10T 408/895; Y10T 408/95

USPC .......... 408/204–209, 239 R; 279/8; 403/321, 403/349
IPC ....................................................... B23B 51/04
See application file for complete search history.

(56) References Cited

U.S. PATENT DOCUMENTS 2,349,400 A * 5/1944 Beckwith ...................... 408/206
2,779,361 A * 1/1957 McKiff ......................... 408/204
3,138,183 A * 6/1964 Stewart ......................... 408/206
(Continued)

FOREIGN PATENT DOCUMENTS

AU   WO 2004085104 A1 * 10/2004   ......... B23B 51/0473

*Primary Examiner* — Eric A Gates
(74) *Attorney, Agent, or Firm* — Sand & Sebolt (57) ABSTRACT

A hole-saw assembly including a hole-saw having at one end a plurality of cutting teeth and at the other end a base having two holes therethrough. two shafts. The assembly includes a mandrel coaxially aligned with said hole-saw and including a body having two bores therethrough, and an annulus located on top of the body which is coaxially aligned with said mandrel and hole saw. The annulus includes two shafts co-axial with the mandrel bores, and is rotatable around its longitudinal axis from a first to a second position. In the first position the annulus shafts are aligned with the base holes allowing the shafts to be freely insertable and removable and in the second position the shafts are misaligned to lock the shafts to the base. In one embodiment the mandrel bores are shaped to accommodate rotation of the shafts, and in a further embodiment, the shafts are configures to rotate within circular mandrel bores. Such an arrangement allows the hole-saw and the mandrel to be easily and quickly mountable and demountable.

7 Claims, 8 Drawing Sheets

(52) U.S. Cl.
CPC ........ *Y10T 408/8973* (2015.01); *Y10T 408/95* (2015.01); *Y10T 408/96* (2015.01)

(56) References Cited

U.S. PATENT DOCUMENTS

| | | | | |
|---|---|---|---|---|
| 3,267,975 A * | 8/1966 | Enders | ........................... | 408/200 |
| 3,647,310 A * | 3/1972 | Morse | ........................ | 408/239 R |
| 3,758,221 A * | 9/1973 | Meshulam | .................... | 408/204 |
| 3,784,316 A * | 1/1974 | Bittern | ........................... | 408/204 |
| 3,837,759 A * | 9/1974 | Bittern | ........................... | 408/204 |
| 3,880,546 A * | 4/1975 | Segal | ............................ | 408/204 |
| 3,973,862 A * | 8/1976 | Segal | ............................ | 408/204 |
| 4,036,560 A * | 7/1977 | Clark et al. | ................... | 408/204 |
| 4,148,593 A * | 4/1979 | Clark | ............................ | 408/204 |
| 4,968,189 A * | 11/1990 | Pidgeon | ........................ | 408/1 R |
| 5,035,548 A * | 7/1991 | Pidgeon | ........................ | 408/68 |
| 5,076,741 A * | 12/1991 | Littlehorn | ...................... | 408/68 |
| 5,108,235 A * | 4/1992 | Czyzewski | .................. | 408/204 |
| 5,154,552 A * | 10/1992 | Koetsch | ....................... | 408/204 |
| 5,226,762 A * | 7/1993 | Ecker | ........................... | 408/204 |
| 5,246,317 A * | 9/1993 | Koetsch et al. | .............. | 408/204 |
| 5,352,071 A * | 10/1994 | Cochran et al. | .............. | 408/204 |
| 5,435,672 A * | 7/1995 | Hall et al. | ....................... | 408/68 |
| 5,597,274 A * | 1/1997 | Behner | ........................ | 408/204 |
| 5,651,646 A * | 7/1997 | Banke et al. | ................. | 408/204 |
| 5,658,102 A * | 8/1997 | Gale | ............................ | 408/1 R |
| 5,868,532 A * | 2/1999 | Spenser | ....................... | 408/204 |
| 5,967,709 A * | 10/1999 | Thuesen | ...................... | 408/204 |
| 6,357,973 B2 * | 3/2002 | Chao | ............................ | 408/204 |
| 7,097,397 B2 * | 8/2006 | Keightley | .................... | 408/204 |
| 7,101,124 B2 * | 9/2006 | Keightley | .................... | 408/204 |
| 7,163,362 B2 * | 1/2007 | Keightly | ...................... | 408/204 |
| 7,621,703 B2 * | 11/2009 | Keightley | .................... | 408/204 |
| 7,850,405 B2 * | 12/2010 | Keightley | .................... | 408/204 |
| 2004/0018063 A1 * | 1/2004 | Ostermeier | .......... | B23B 31/107 408/204 |
| 2004/0179911 A1 * | 9/2004 | Keightlev | .................... | 408/204 |
| 2004/0247405 A1 * | 12/2004 | Keightley | .................... | 408/204 |
| 2005/0042048 A1 * | 2/2005 | Keightley | ........... | B23B 51/0473 408/204 |
| 2010/0247258 A1 * | 9/2010 | Keightley | .................... | 408/204 |

\* cited by examiner

HOLE SAW ASSEMBLY INCLUDING DRIVE SHAFTS SUPPORTED BY A ROTATABLE ANNULUS

BACKGROUND OF THE INVENTION

The present invention relates to a hole-saw assembly or arrangement and in particular to a hole-saw with a base that is easily demountable and mountable from a mandrel engageable by a drill.

Hole-saws are a very widely used tool for many applications. Typically a hole-saw includes a flat solid base that is locked by a drill, the base providing support for the hole-saw. Some bases include multiple diameter grooves adapted to accommodate hole-saws of different diameters. Yet others are single sized hole-saws.

A universal problem when using hole-saws is that when a hole has been drilled through a material, the material that has been cut out, commonly referred to as the plug, remains embedded within the hole-saw and needs to be removed. Typically the plug is jammed tightly within the hole-saw and considerable force needs to be used to remove the plug using a sharp instrument, such as a screwdriver. However, some materials, such as plastic, possess material characteristics that make their removal difficult. The ejection of those plugs typically requires the whole hole-saw assembly to be removed from the drill to then try and force the plug out.

In response to this widely recognized problem, various improved hole-saw assemblies have been proposed that try and provide an improved method of removing the plug. Whilst some of these have been found to work well, they are generally mechanically quite complicated. Further, the hole-saw is a dedicated size being limited to a pre-determined diameter and to drill larger size holes requires the use of a whole new hole-saw assembly.

It is an object of the present invention to propose a hole-saw that overcomes at least some of the abovementioned problems or provides the public with a useful alternative.

SUMMARY OF THE INVENTION

Therefore in one form of the invention there is proposed a connector assembly including:
an annulus defining a longitudinal axis through its centre, said annulus including a connecting means;
a co-axial driving means adapted to rotate around said longitudinal axis and adapted for rotational engagement with said annulus, said annulus being adapted to rotate between a first and a second position relative to said driving means; and
a device including a locking base co-axial with said annulus and driving means, said locking base adapted to rotate around the longitudinal axis and engage the annulus connecting means when in said first position to prevent longitudinal relative motion of said base, driving means and annulus.

Preferably when said annulus is in said second position, the locking base is free for longitudinal motion from said driving means and annulus.

In preference said connecting means extends inwardly in the opposite direction.

In preference said annulus is biased to said first position.

In a further form of the invention there is proposed a connector assembly including:
an annulus having a longitudinal axis said locking annulus including a longitudinally extending projection;
a driving means coaxially aligned with said annulus and including a body having a passage coaxially aligned with said projection;
a device including a locking base which is coaxially aligned with said driving means and annulus, said locking base including a passage, said annulus rotatable around its longitudinal axis from a first to a second position wherein in said first position said projection is aligned with said locking base passage and said driving means passage, allowing said projection to be freely insertable and removable and in said second position said projection being misaligned thereby locking the projection shoulder to said driving means.

Preferably there are at least two projections co-axially aligned with two driving means passages and two locking base passages.

In a still further form of the invention there is proposed a rotational tool support assembly including:
a base associated with said tool, said base including two holes;
an annulus coaxially aligned with said base and adapted to support two shafts, said annulus rotatable around its longitudinal axis from a first to a second position;
a driving means coaxially aligned with said base and including a body having two bores therethrough coaxially aligned with said shafts, wherein when said annulus is in said first position said shafts are aligned with said base allowing said shafts to be freely insertable and removable, and in said second position said shafts being misaligned thereby locking the shafts to said base.

In a yet further form of the invention there is proposed a hole-saw assembly including:
a hole-saw having at one end a plurality of cutting teeth and at the other end a base including two holes;
a mandrel coaxially aligned with said hole-saw and including a body having two bores therethrough;
an annulus rotatably engageable with said mandrel, said annulus including two shafts coaxially aligned with said bores and being moveable with respect to said mandrel from a first to a second position, wherein in said first position said shafts are aligned with said base holes allowing said shafts to be freely insertable and removable and in said second position said shafts being misaligned thereby locking the shafts to said base.

Preferably said annulus is biased to said second position.

Preferably said base forms part of the hole-saw body which when connected to the mandrel is prevented from rotational motion relative thereto.

Alternatively said base is in the form of a locking ring which when attached to the mandrel is prevented from rotational motion relative thereto, said locking ring including an attachment means for attaching one or more hole-saws thereto.

Preferably said hole-saw includes a threaded inner bore adapted to engage a threader outer projection extending from said locking ring.

Preferably said shafts include a flute adjacent said outer end and a cap on said outer end, the cap having an inner surface adapted to engage the base when said annulus is in said second position to thereby lock the shafts from longitudinal movement from the base.

In preference said hole-saw assembly includes a drill-bit mounted on said mandrel, said drill-bit extending through and beyond said hole-saw.

In a still further form of the invention there is proposed a hole-saw assembly including:

a hole-saw having a longitudinal body with a plurality of cutting teeth at one end and a threaded inner bore at the other end;

a base including a disk co-axially aligned with said hole-saw body and including a threaded projection extending longitudinally therefrom, said projection adapted to be engaged by said hole-saw threaded bore, said disk further including two holes;

a mandrel co-axially aligned with said base and hole-saw and including a body having a drill bit extending therefrom, said drill bit passing through central apertures in the base and hole-saw, said mandrel further having two bores therethough; and an annulus resting on top of said mandrel and including a pair of shafts extending in a longitudinal direction towards the hole-saw, each said shaft including a column adjacent said annulus a flute adjacent a shaft outer end and a chamfered cap, the diameter of said cap equal to the diameter of said column, said annulus being rotatable between a first and a second position wherein in the first position said shafts are aligned with the holes in the base, and in said second position are misaligned, the thickness of the mandrel body and the base being such that the flute is engaged by said base with the cap extending beyond a shoulder thereof so that when the annulus is in said second position the base locks said shafts in a relative longitudinal position, said mandrel bores being of a shape to accommodate rotation of the columns.

In a yet further form of the invention there is proposed a hole-saw assembly including:

a hole-saw having a longitudinal body with a plurality of cutting teeth at one end and a base at the other having a threaded inner bore and two holes;

a mandrel co-axially aligned with said hole-saw base and including a body having a drill bit extending therefrom, said drill bit passing through the hole-saw inner bore, said mandrel further having two apertures therethough; and an annulus resting on top of said mandrel and including a pair of shafts extending in a longitudinal direction towards the hole-saw, each said shaft including a column adjacent said annulus and a chamfered cap, said annulus being rotatable between a first and a second position wherein in the first position said shafts are aligned with the holes in the base, and in said second position are misaligned, the thickness of the mandrel body and the hole-saw base being such that the column is engaged by said base with the cap extending beyond the hole-saw base so that when the annulus is in said second position the base locks said shafts in a relative longitudinal position, said mandrel bores being of a shape to accommodate rotation of the columns.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
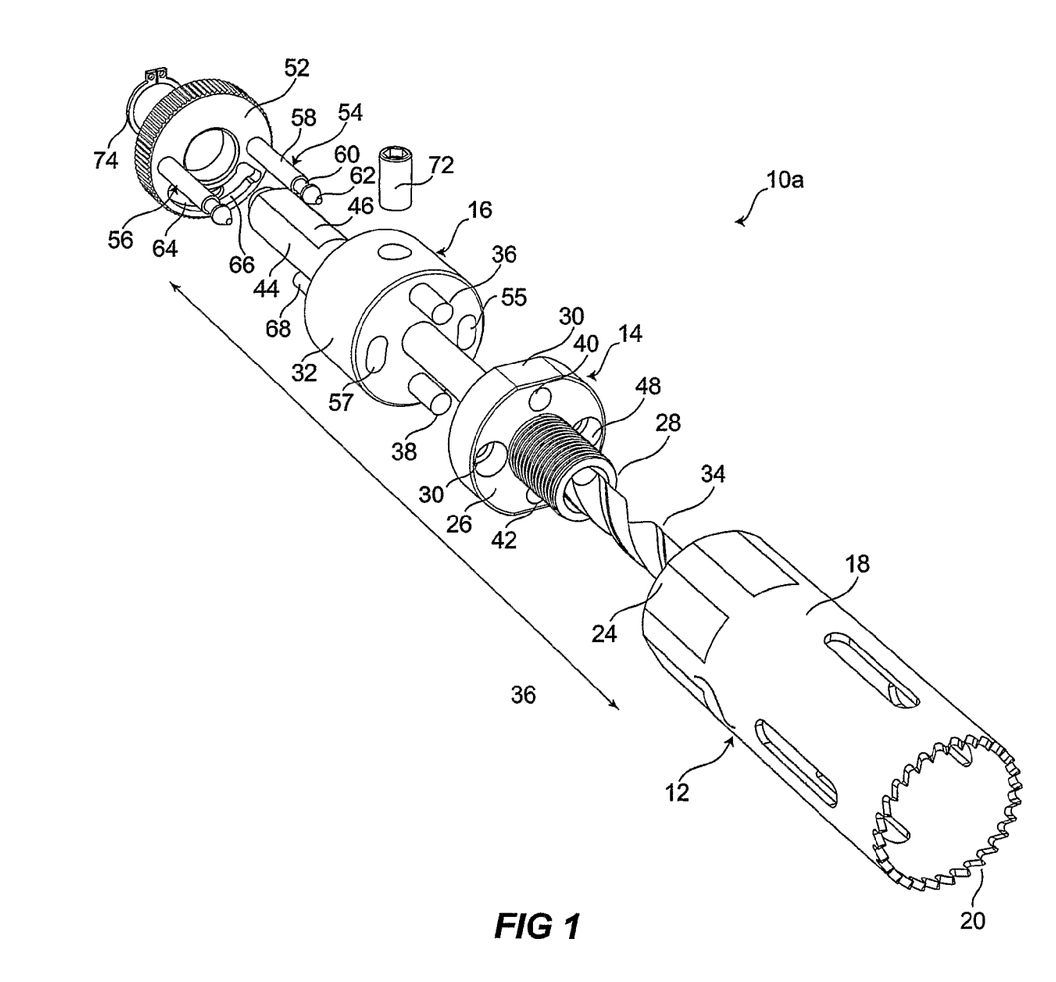
FIG. 1 is an exploded, front perspective view of a hole-saw assembly according to a first embodiment of the present invention.
Figure 2:
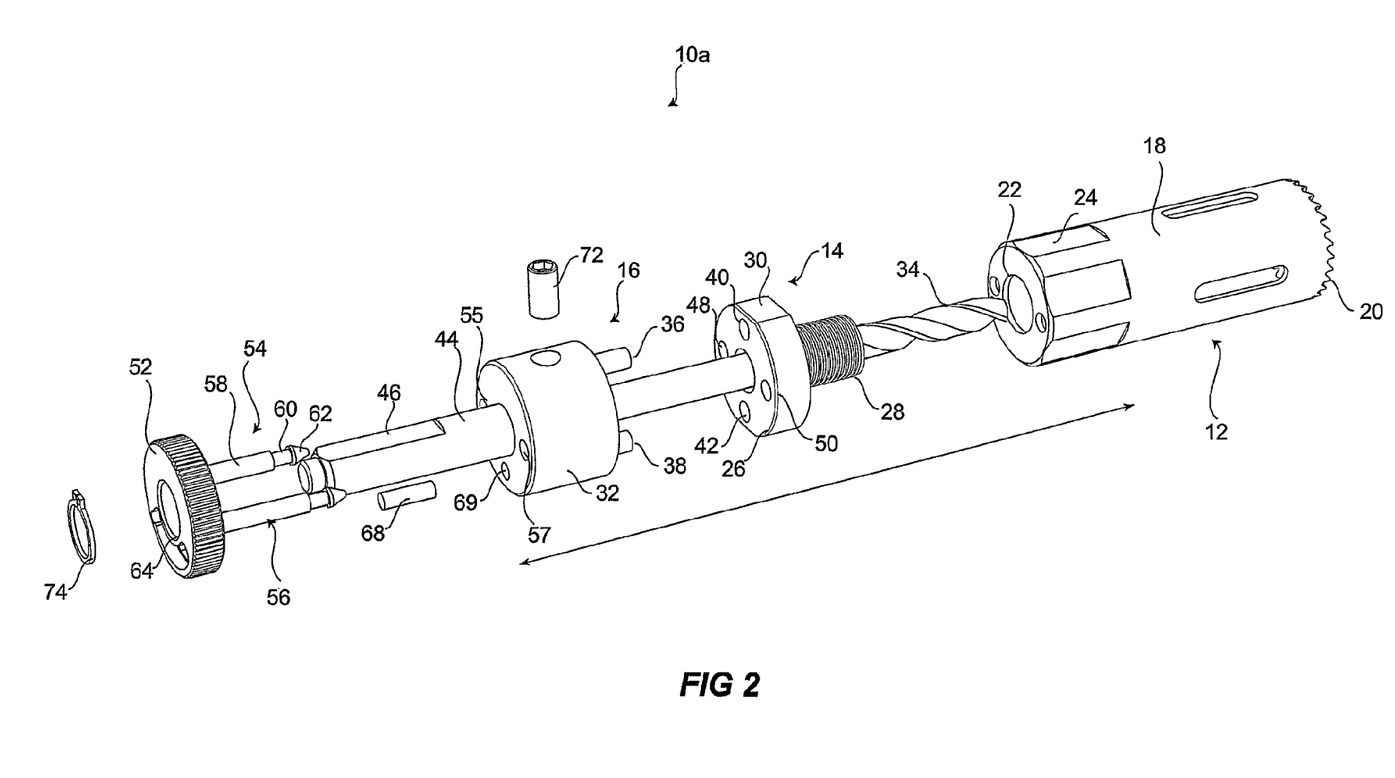
FIG. 2 is an exploded, rear perspective view of the hole saw assembly of FIG. 1.
Figure 3:
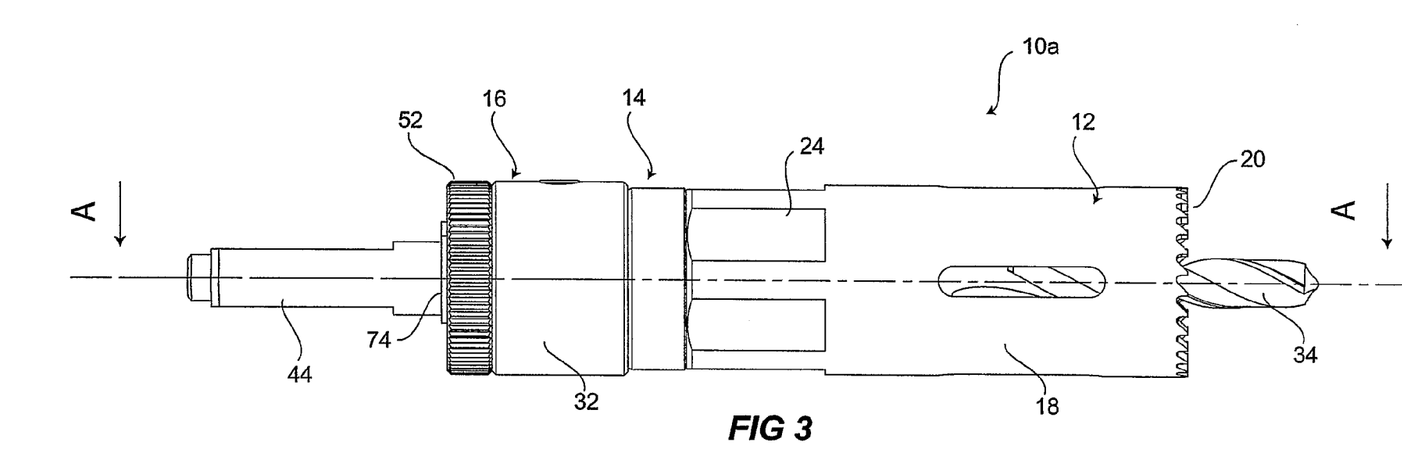
FIG. 3 is a side view of the hole-saw assembly of FIG. 1.
Figure 4:
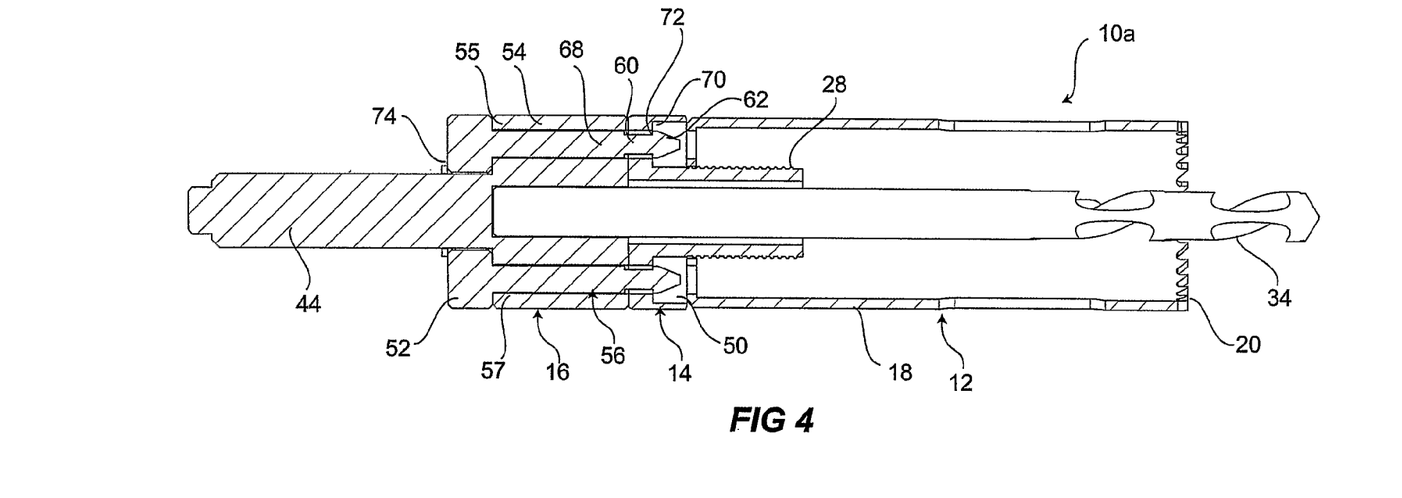
FIG. 4 is a partial, cross-sectional view of the hole saw assembly of FIG. 3 through line A-A.
Figure 5:
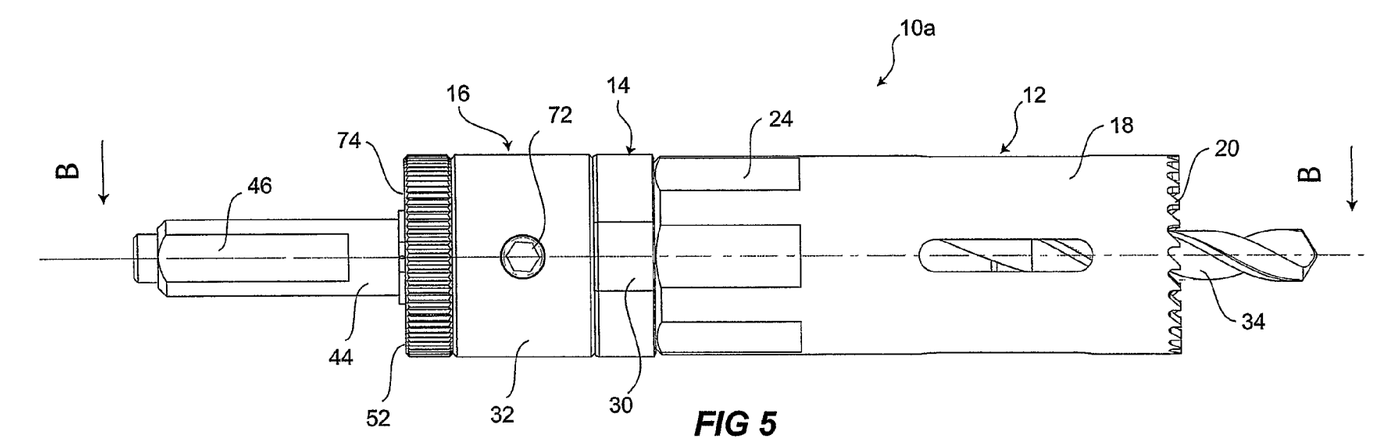
FIG. 5 is a top view of the hole-saw assembly of FIG. 1.
Figure 6:
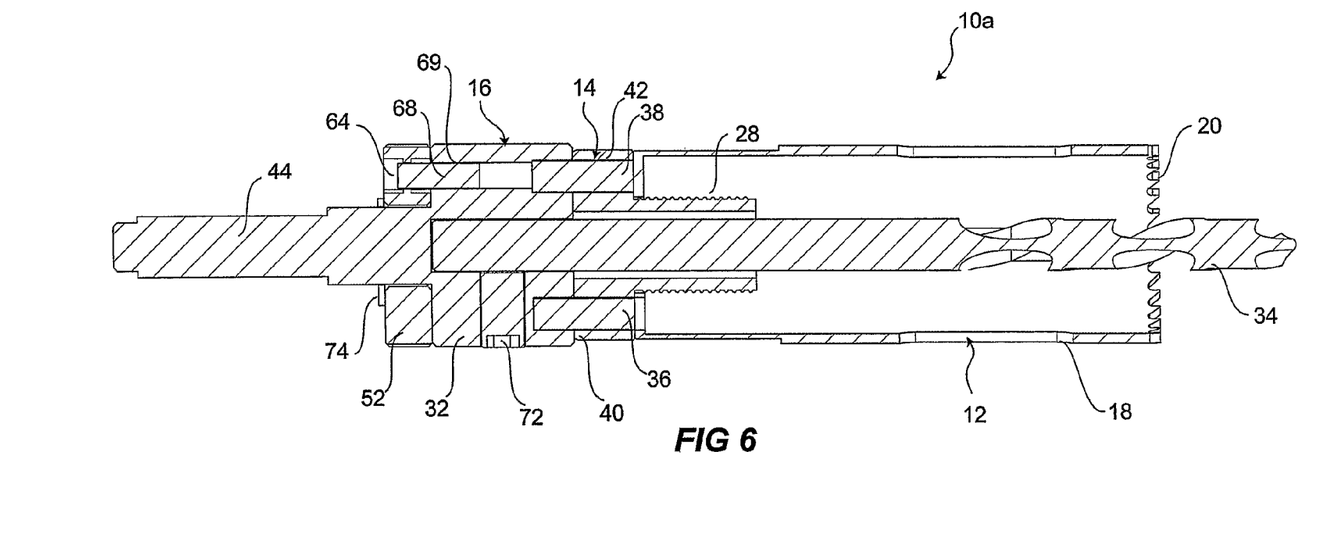
FIG. 6 is a partial, cross-sectional view of the hole saw assembly of FIG. 5 through line B-B.
Figure 7:
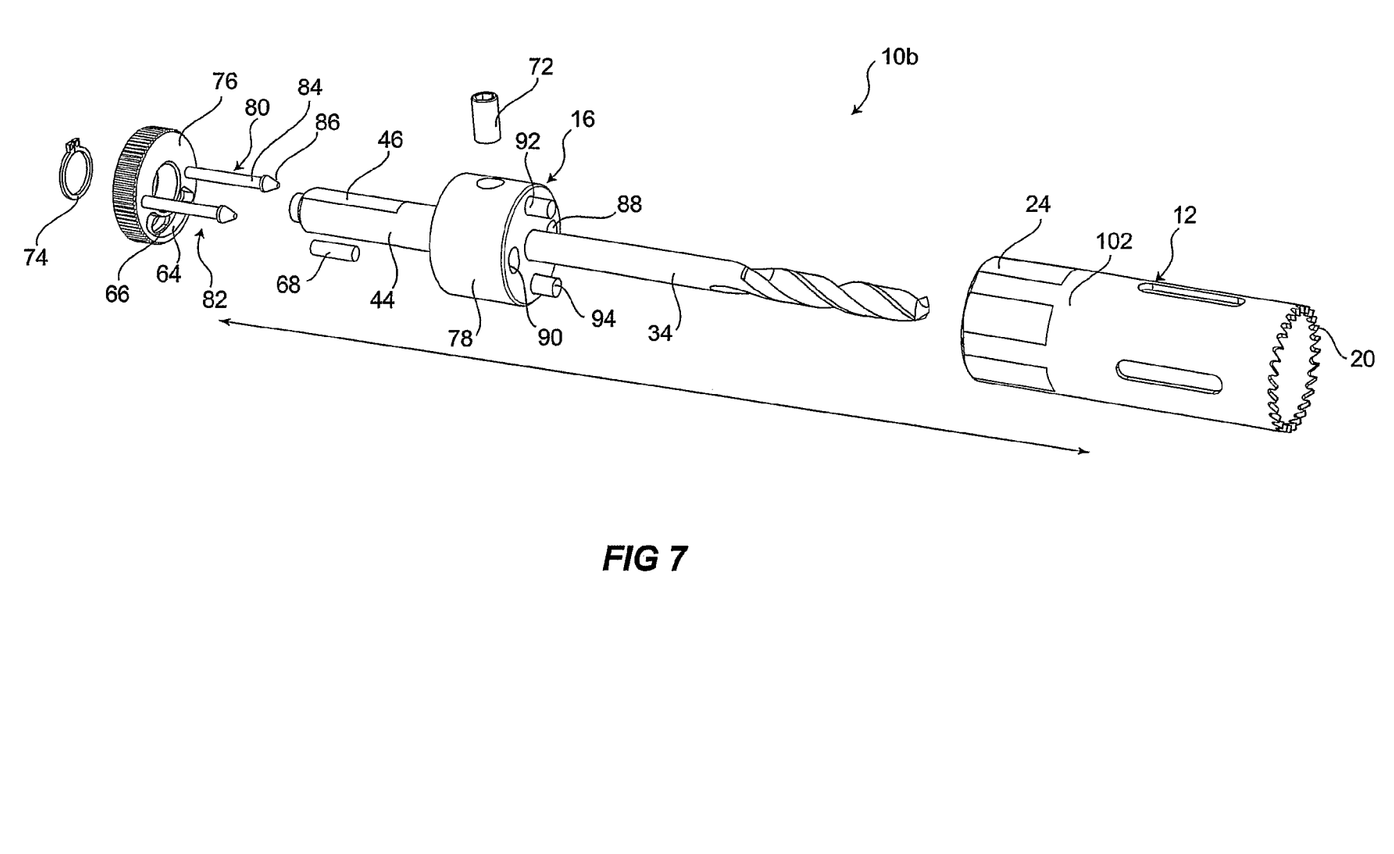
FIG. 7 is an exploded, front perspective view of a hole-saw assembly according to a second embodiment of the present invention.
Figure 8:
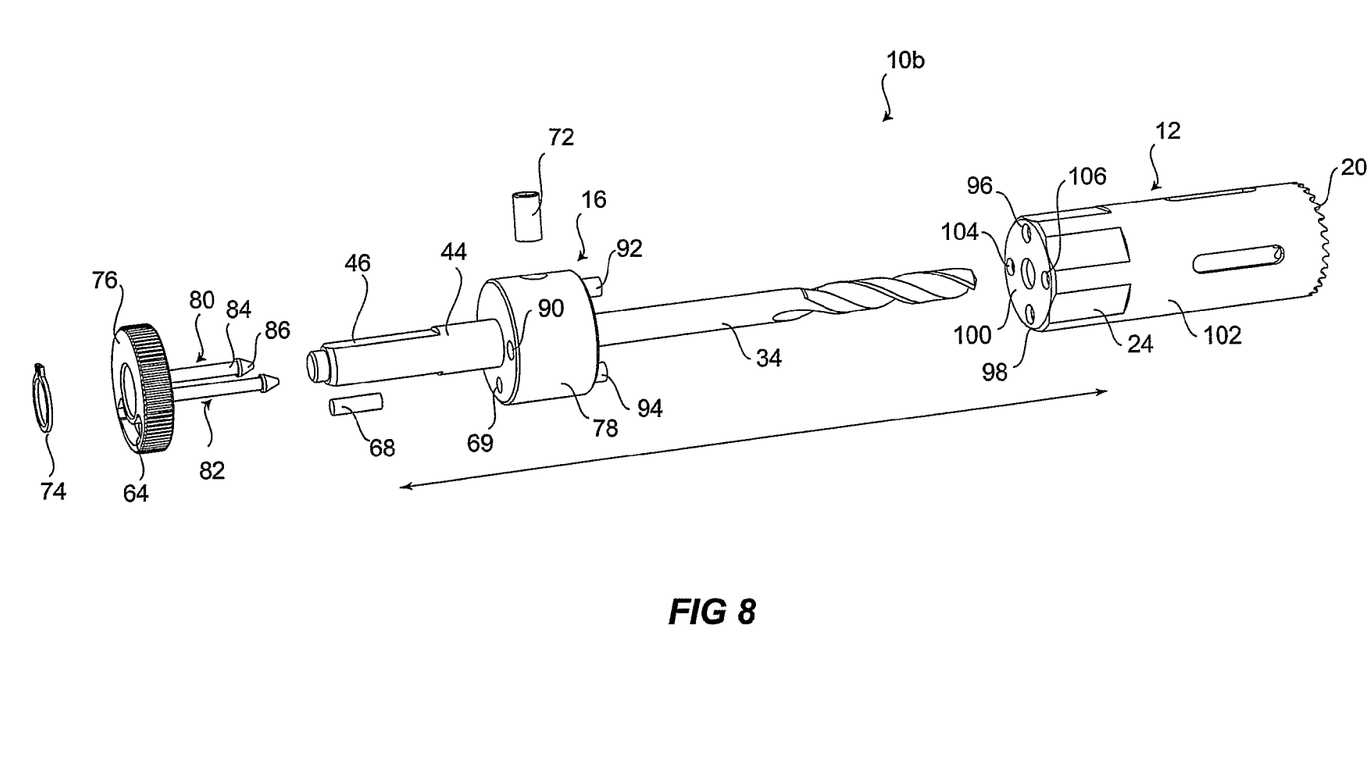
FIG. 8 is an exploded, rear perspective view of the hole saw assembly of FIG. 7.
Figure 9:
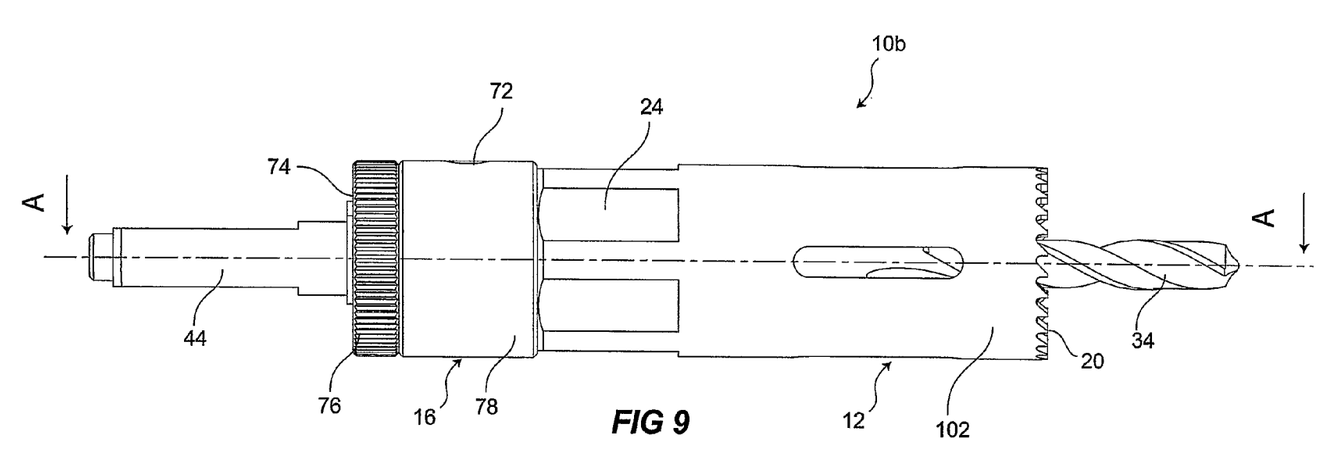
FIG. 9 is a side view of the hole-saw assembly of FIG. 7.
Figure 10:
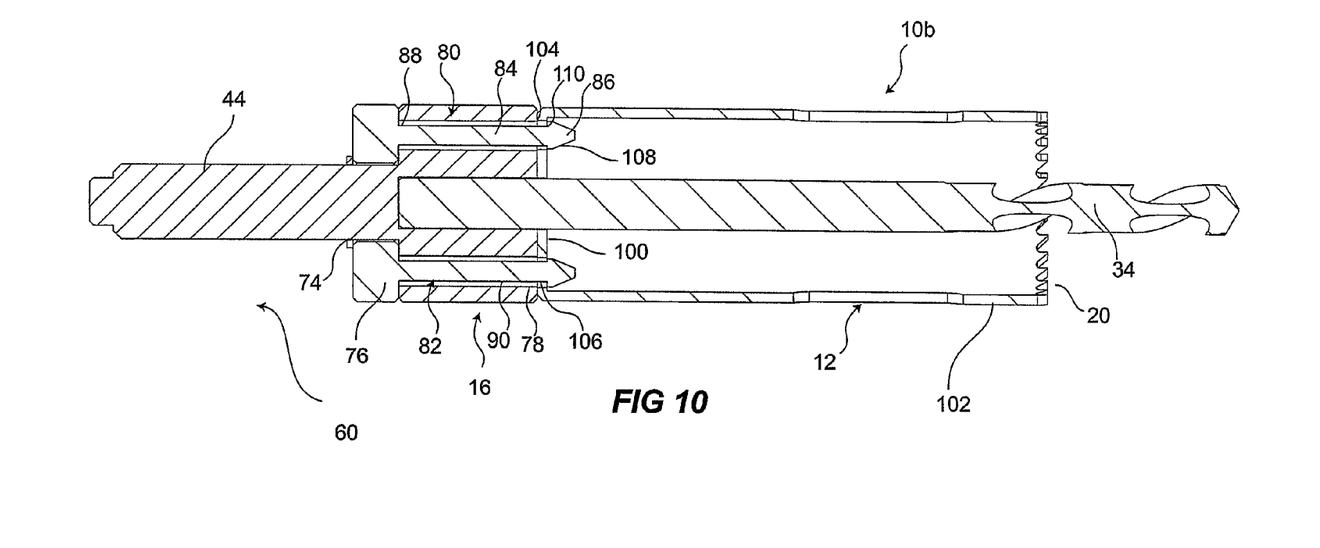
FIG. 10 is a partial, cross-sectional view of the hole saw of FIG. 9 through line A-A.
Figure 11:
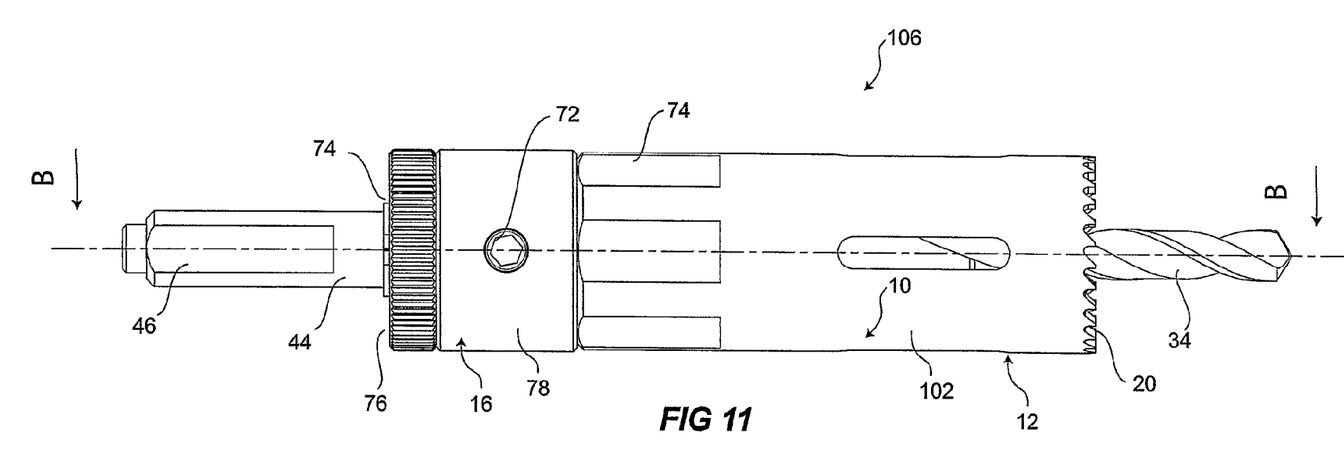
FIG. 11 is a top view of the hole-saw assembly of FIG. 7.
Figure 12:
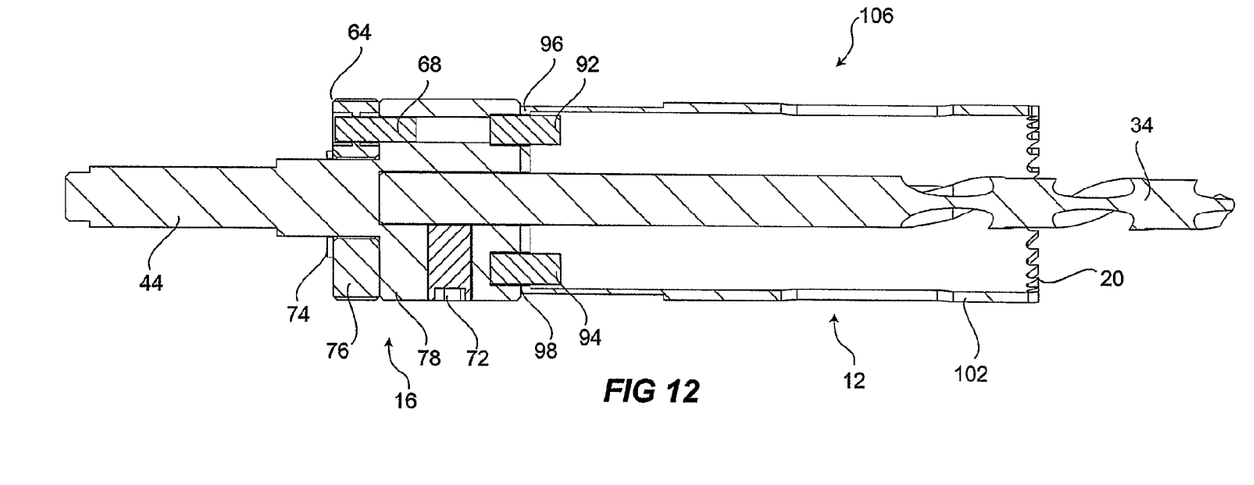
FIG. 12 is a partial, perspective view of the hole saw assembly of FIG. 12 through line B-B.

FIGS. 1 to 6 illustrate a hole-saw assembly 10a according to a first embodiment of the present invention, whilst FIGS. 7-12 illustrate a hole saw assembly 10b according to a second embodiment. It is to be understood that similar features between the first and second embodiments will be referred to using like numbers.

Referring firstly to FIGS. 1 to 6 there is shown hole-saw assembly 10 including a hole-saw 12, a base or locking ring 14, and mandrel 16.

The hole-saw 12 includes a cylindrical body 18 having cutting teeth 20 at one end thereof. At the opposite end the hole-saw 12 includes a threaded bore 22 (with inner threads), the outer surface of the hole-saw body 18 adjacent the bore 22 including circumferentially disposed shoulders 24 to enable a tool (not shown) such as a wrench to engage the hole-saw 12 for rotational movement thereof.

The base 14 includes a disk 26. Extending co-axially from the disk 26 is a threaded projection 28 (with outer threads), of a size and shape to be engaged by the bore 22 thus enabling hole-saw 12 to be tightly screwed onto the base. The disk 26 includes shoulders 30 for engagement by a tool. Those skilled in the art will appreciate that by the use of two tools, one on the hole-saw 12 and one on the base 14, the hole-saw may also be removed from the base.

The mandrel 16 includes a longitudinal body 32 removably affixed to which is a drill bit 34 extending co-axially therefrom. Extending alongside and in the same direction as the drill bit 34 are two diametrically opposed locking pins 36 and 38 adapted to engage respective, correspondingly positioned bores 40 and 42 in the base 14, when the base 14 is placed on the mandrel 16. This engagement effectively locks the base 14 to the mandrel body 32 and thereby prevents rotational motion of the base 14 and hence the attached hole saw 12 relative thereto. Extending in the opposite direction to the drill bit 34 is an arbour 44 having shoulders 46 and is insertable into a drill (not shown) as is well known in the art. The disk 26 includes two further diametrically opposed holes 48 and 50 which are radially offset from bores 40 and 42 by approximately 90 degrees. The holes 48 and 50 and their purpose is described in further detail below.

A co-axial annulus 52 is located at the base of the mandrel body 32 and extending from the annulus 52 in the same direction as the drill bit 34 are two diametrically opposed, identical shafts 54 and 56 located adjacent the edge of the annulus 52. The mandrel body 32 includes two substantially elliptical holes 55 and 57 whose location and size is such to allow for the insertion, passage through, and slight rotation of respective shafts 54 and 56 respectively, as will become obvious.

Since the two shafts 54 and 56 perform the same function, that is to prevent base 14 and attached hole saw 12 from longitudinal movement, only one will be described. It is however to be understood that the description applies equally well to both.

Shaft 54 includes a column 58 extending from the annulus 52 and attached to the annulus using well-known techniques such as threads or press fitting. Adjacent the outer end of the column 58 is a flute 60, the column then having a chamfered cap 62 fixed on its outer end whose outer diameter is equal to the diameter of the column 58.

The co-axial annulus or ring 52 is rotatably movable with respect to the mandrel body 32 between a first and a second position, the biasing arrangement being as follows. The annulus 52 includes a groove 64 within which is located the biasing means, typically a spring (not shown). At one end of the groove 64 is located a channel 66 within which slidably moves a pin 68. The pin 68 engages a correspondingly shaped bore 69 in the mandrel body 32 whereby it is locked into place when the mandrel 16 is placed on top of the annulus 52. The length of the channel 66 within which the pin 68 can effectively move therefore limits rotation of the annulus 52.

The length of the mandrel body 32 is the same length as that of the shaft column 58 such that when the shaft 54 is inserted into body 32 the flute 60 and the cap 62 protrude beyond the body 32. Those skilled in the art will appreciate that the shaft flute 60 and cap 62 extend into the base 14 when it is placed on top of the mandrel body 16.

As mentioned, the base 14 includes two further holes 48 and 50. Hole 48 and 50 are also identical and so only will be described. The portion of the hole 48 adjacent the upper surface of the disk 26 is partially enlarged with respect to the lower side of the disk 26, to thereby provide an inner shoulder 70. Accordingly, the base holes 48 and 50 are of a first circular cross-section only for the length of the flute 60 from the bottom surface of the disk 26, and are then enlarged to accommodate for the rotational movement, of the annulus 52 to lock and unlock the shafts 54 and 56 to the mandrel 16. Therefore, when the annulus 52 is in the second position with the shaft 54 fully inserted into the mandrel 16, the inner shoulder 70 is engaged by the lip 72 of the cap 62, effectively preventing the shaft 54 from being withdrawn from the mandrel 16. In locking the base 14 and hence the hole-saw 12 to the mandrel 16 in this way, the hole-saw is ready to be used to drill a hole.

The annulus 52 is biased to the second position, that is, the locked position and a rotational force has to be applied to rotate it to the first position to enable for the withdrawal of the shafts 54 and 56. The elliptical apertures 55 and 57 are dimensioned to allow for movement of the shafts 54 and 56 between the first and second positions. The rotation from the biased second position to the first position is generally in the same direction as the rotation of the drill.

The skilled addressee will now appreciate that the present hole-saw assembly of the present invention enables for the very quick mounting and unmounting of a hole-saw and base to a mandrel that is already mounted in a drill. Since the diameter of the hole-saw is independent of the size of the base and hence the mandrel, one may have a number of hole-saws that they simply mount and unmount to and from the mandrel by rotating the annulus between the first and second positions.

However, to further assist in quick mounting of the hole-saw base 12 to the mandrel 16, the lower circular edges of holes 48 and 50 on the underside of the disk 26, that is the side which abuts with upper surface of the mandrel body 32, may be tapered or chamfered. As the shafts 54 and 56 are inserted into the mandrel 16 through apertures 55 and 57 and holes 48 and 50 of the base 14, the chamfered cap 62 forces the annulus 52 to rotate to the first position. As the cap 62 passes beyond the inner shoulder 70 of the base 14, the biasing means causes it to snap back into its biased position thereby locking the base 14 and hence the hole-saw 12 to the mandrel 16. This provides the tool operator with an automatic "snap-fit" arrangement.

The mandrel body 32 is typically clamped onto the drill bit 34 using a grub screw 72. However, it may equally well be attached, as would be known by the skilled addressee, using other common techniques. The annulus 52 is secured in its position using a circlip 74.

The projection 28 of the base 14 illustrated in FIGS. 1-6 may be made significantly longer than is currently known. Alternatively, the projection 28 could include two different diameters, the larger of which is located adjacent the disc 26. Both of these configurations enable two hole-saws to be mounted on the one base. This is a particularly useful feature where the operator may wish to drill a bigger hole over an existing hole wherein the size of the smaller hole-saw is chosen to be the size of the already existing hole. The smaller hole-saw is then used as an effective guide center to be able to cut out the bigger hole in a symmetrical arrangement.

Turning now to the second embodiment of the present invention illustrated in FIGS. 7-12, where there is shown a hole-saw assembly 10b in which the hole-saw 12 is directly lockable to the mandrel body 16 without the need for a base/locking ring. It is to be understood that like parts are referred to using like numbers and may not be described again.

The co-axial annulus or ring 76 is similar to that previously described in that it is rotatably movable with respect to the mandrel body 78 between a first and a second position. The shafts 80 and 82 extend from the same position and in the same direction and again, only shaft 80 will be described in the following paragraphs given that shaft 82 is identical.

Shaft 80 includes a column 84 having a smaller diameter to that of shaft 54 of the first embodiment. The diameter is approximately equivalent to that of the flute 60 in assembly 10a. So in the present embodiment there is effectively no longer a flute portion, just a thin column 84 terminating in a chamfered cap 86. The benefit of having a column of this size and shape is so that elliptical apertures do not need to be drilled into the mandrel body 78. The circular apertures 88 and 90 in the mandrel body 78 are therefore positioned and sized to allow for the insertion, passage through, and rotation of the respect shafts 80 and 82 between the first and second positions. The diameter of each aperture is slightly larger than the chamfered caps.

Those skilled in the art would realize the cost and time benefits in having circular apertures 88 and 90 as opposed to the elliptical apertures proposed in assembly 10a which require skilled machining of the mandrel 16.

Extending alongside and in the same direction as the drill bit 34 are two diametrically opposed locking pins 92 and 94 adapted to engage correspondingly positioned holes 96 and 98 extending through the base 100 of the hole-saw body 102. This engagement effectively locks the hole-saw 12 to the mandrel 16 and thereby prevents rotational motion of the hole-saw 12 relative thereto. The hole-saw base 100 includes two further diametrically opposed holes 104 and 106 which are radially offset from holes 96 and 98 by approximately 90 degrees. The purpose of holes 104 and 106 is described in further detail below.

The length of shaft 80 is such that when inserted into the mandrel 16, the cap 86 and a short portion of the column 84 which is approximately equivalent to the width of the hole-saw base 100, protrude beyond the mandrel body 78. Those skilled in the art will appreciate that the protruding portion of shaft column 84 and cap 86 extend into the diametrically opposed holes 96 and 98 at the base of the hole-saw body when it is placed on top of the mandrel 16.

The hole-saw 12 is locked in place by substantially the same means as described above in the first embodiment whereby an inner shoulder 108, which is essentially the internal surface of the hole-saw base 100, is able to accommodate for the rotational movement of the annulus 76 to lock and unlock the shafts 80 and 82 to the mandrel 16. Therefore, when the annulus 76 is in the second position with the shaft 80 fully inserted into the mandrel 16, the inner shoulder 108 is engaged by the lip 110 of the cap 86, effectively preventing the shaft 80 from being withdrawn from the mandrel 16. Once again, in locking the hole-saw 12 to the mandrel 16, the hole-saw is ready to be used to drill a hole.

As with the first embodiment, the annulus 76 is biased to the second position being the locked position, and a rotational force has to be applied to rotate it to the first position to enable the withdrawal of shafts 80 and 82. The rotation from the biased second position to the first position is generally in the same direction as the rotation of the drill. Again, the holes 106 and 108 may be tapered or chamfered adjacent the underside of the base to allow for the above-mentioned "snap-fit" type connection.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A hole saw assembly comprising:
   a hole saw adaptor having at one end a projected threaded portion and at the other end a face;
   the face having at least one drive shoulder and further having at least one locking aperture; and
   the adaptor further having a longitudinal bore therethrough;
   a mandrel being engageable at one end with a drilling machine, at the other end having an arbor head, the arbor head having a drill bit projecting longitudinally from its center;
   the arbor head further having at least one drive shaft extending longitudinally from said arbor head;
   the arbor head further having at least one locking pin extending longitudinally from said arbor head;
   wherein the locking pin is moveable from a first lock position to a second unlock position; and
   wherein upon partial insertion of the adaptor onto the drill bit and into contact with the arbor head, the at least one drive shaft rotationally engages the drive shoulder of the adaptor and wherein upon further insertion of the adaptor onto said drill bit, the locking pin engages the at least one locking aperture relative to longitudinal movement between the arbor head and the mandrel.

2. The hole saw assembly as in claim 1 wherein the at least one locking pin is biased in the lock position.

3. The hole saw assembly as in claim 1 wherein said at least one locking pin is biased into the first lock position; and wherein movement of the adaptor onto the drill bit causes rotational movement of the at least one locking pin from the first lock position to the second unlock position; and when the at least one locking pin passes into the adaptor, the at least one locking pin moves back to the first lock position.

4. The hole saw assembly as in claim 1 wherein the arbor head has two driveshafts.

5. The hole saw assembly as in claim 1 wherein the arbor head has two locking pins.

6. The hole saw assembly as in claim 1 wherein the adaptor has two drive shoulders.

7. The hole saw assembly as in claim 1 wherein the adaptor has two locking apertures.

* * * * *